# 2,762,819

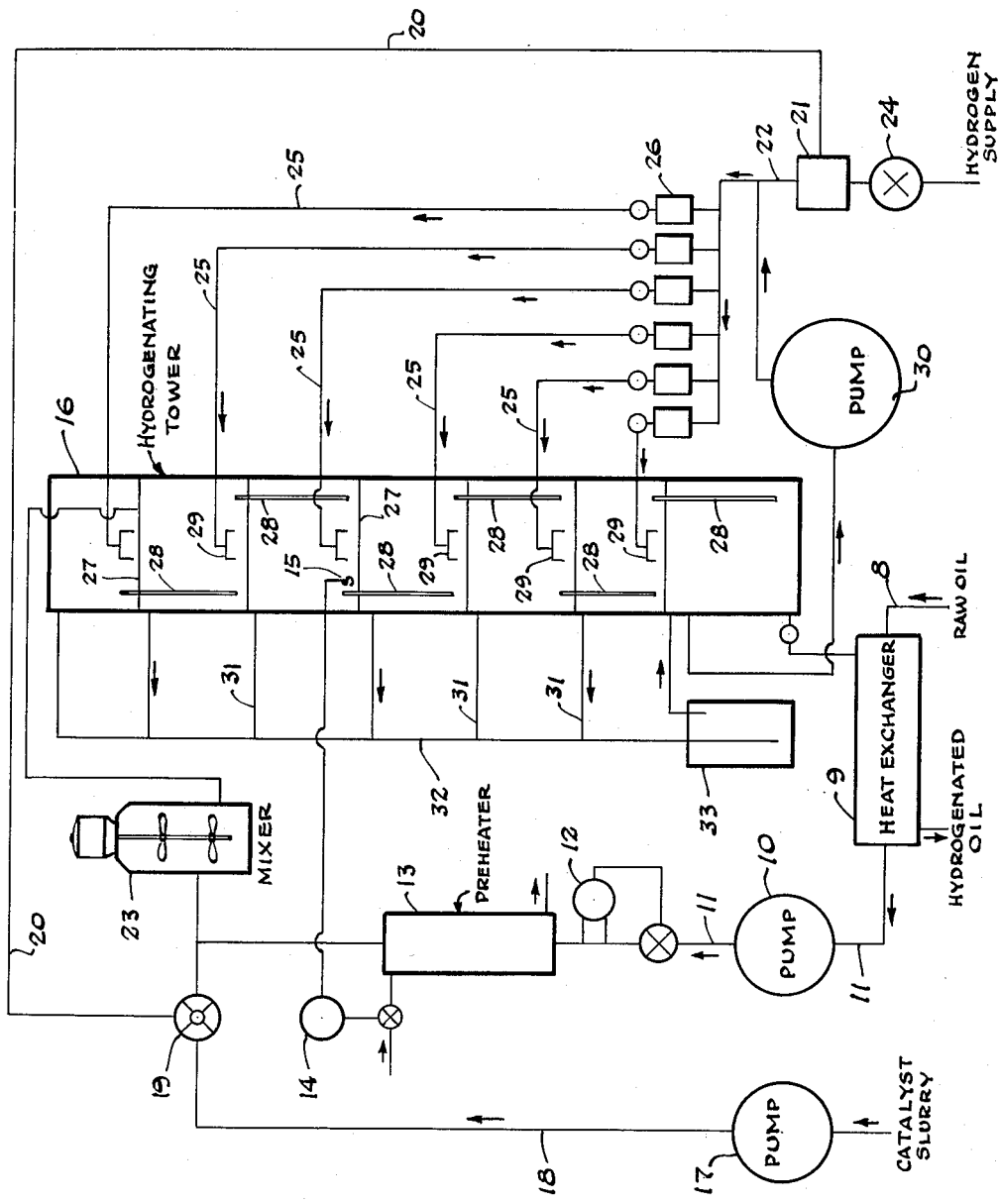

CONTINUOUS PROCESS OF HYDROGENATION

Walter F. Bollens, Chicago, Ill., assignor to Swift & Company, Chicago, Ill., a corporation of Illinois Application May 21, 1952, Serial No. 289,153

5 Claims. (Cl. 260—409)

This invention relates to a continuous process for the hydrogenation of fatty materials, and more particularly to a process for the partial hydrogenation of unsaturated fatty acids and glyceride fats and oils in an automatic and continuous manner.

In the past most hydrogenation processes have been carried out batch-wise and suffer the inherent disadvantage of being intermittent methods of treatment incapable of rapidly producing large quantities of partially hydrogenated stock. Continuous methods using fixed catalyst beds have been proposed but have not been entirely successful because of the uncertainty of the degree of hydrogenation after the process has been in operation sufficiently long to cause a variation in the activity of the catalyst. Because of the variable activity of even fresh catalyst and the presence of variable amounts of catalyst poisons in the oils, it has been necessary to analyze the amount of hydrogen absorption of an unsaturated material at progressive stages in the hydrogenation process if the iodine number of the end product is to be controlled and if wasteful excesses of hydrogen and catalyst are to be avoided.

It is an object of this invention to hydrogenate unsaturated glyceride fats and oils continuously to a predetermined degree of saturation by accurately controlling the factors influencing the hydrogenation.

A further object of this invention is to regulate the quantity of a catalyst slurry admixed with an unsaturated glyceride fat or oil to control the amount of hydrogenation thereof.

Another object of this invention is to more nearly utilize the full hydrogenation capacity of a catalyst before discarding the same or subjecting the same to a reactivating treatment.

Still another object of this invention is to hydrogenate glyceride fats and oils to a uniform degree in a continuous manner.

Additional objects and advantages of this invention will be apparent upon a reading of this specification and the appended claims.

The temperature of the oil, the pressure of the hydrogen, and the volumetric flow of the oil and hydrogen affect the degree of hydrogenation of the oil; but if temperature, pressure, and volumetric flow are held reasonably constant, the quantity of activated hydrogenation catalyst may be varied in a continuous operation to effect any desired degree of hydrogenation. The time of hydrogenation reaction is important, but for a given piece of equipment in a continuous operation the time is determined by the volumetric flow of the oil.

The concentration of catalyst controls the rate of the reaction so that a given iodine number can be obtained in a given time. Thus, in a column, at a given constant oil flow, the oil is in contact with the hydrogen for a given length of time. The rate of hydrogen absorption then determines the iodine value of the oil leaving the column. Since the amount of catalyst added controls the rate of absorption, the catalyst addition may be regulated by a catalyst controller operating in response to the rate of flow of the hydrogen. By regulating the addition of catalyst and hydrogen a constant predetermined rate of hydrogen absorption and a predetermined constant iodine value are obtained.

The drawing illustrates diagrammatically one form of apparatus for carrying out the process of this invention.

Referring to the drawing, pump 10 draws oil from line 8 through heat exchanger 9 and forces the preheated oil into line 11 where a flow controller 12 effects a constant volumetric flow. Preheater 13 adjusts the temperature of the oil in response to thermostat 14 governed by temperature sensitive element 15 in the hydrogenation tower 16. Catalyst slurry is forced from a suitable source of supply (not shown) by pump 17 into line 18 where catalyst proportioning valve 19 adjusts the volumetric flow thereof in response, through conduit 20, to hydrogen control meter 21 in the hydrogen supply line 22. Mixer 23 may be employed to effect a dispersion of the catalyst throughout the oil before passing the catalyst and oil into hydrogenation tower 16, preferably near the top. Hydrogen under pressure flows through pressure regulator 24 in the hydrogen line 22, through hydrogen control meter 21, and into the hydrogenating tower 16. The incoming hydrogen may be passed into a plurality of lines 25 regulated by individual flow meters, as at 26, to supply each chamber of the hydrogenation tower 16 with a graduated or equal amount of hydrogen, as desired. In the hydrogenation tower 16 the oil and catalyst flow from top to bottom over horizontal trays 27 which divide the tower into a plurality of chambers. The oil and catalyst pass from one chamber to another through downflow pipes 28. Hydrogen is bubbled through the oil in each chamber preferably with the aid of bubble caps 29. To maintain a constant circulation of the hydrogen through the tower, hydrogen circulation pump 30 may be employed. Exit conduits 31 for hydrogen from the chambers unite with a conduit 32 in which an oil trap 33 may be inserted to remove entrained oil from the recirculated hydrogen.

Substantially uniform hydrogenation of the oil is accomplished by maintaining the temperature reasonably constant. By preheating an oil and by dissipating, as by cooling, the exothermic heat generated in the hydrogenation tower, the actual temperature of hydrogenation may be maintained within desirable limits. Generally a preferable temperature for the hydrogenation is around 350° F., but this may vary from 250° F. to 450° F. The temperature to which the oil is preheated varies depending on the hydrogenation temperature required, which in turn varies with the rate of hydrogenation, the amount of hydrogenation, and the particular characteristics of the glyceride material undergoing treatment.

The pressure under which the hydrogenation action occurs is also, within limits, maintained constant to produce a uniformly hydrogenated oil. Generally a pressure between atmospheric and about 100 pounds per square inch gage may be used. The pressure will depend on the material hydrogenated and the products desired.

The catalyst slurry may be formulated by mixing the desired amount of the oil with the catalyst. A suitable slurry is 2.5 per cent nickel suspended in a portion of the fat to be hydrogenated. The catalyst may be produced by any well known or preferred method, but the finished catalyst usually contains an oil suspension of a reduced nickel with or without certain activator metals. A carrier such as diatomaceous earth or other inert material may also be used. Platinum and palladium have also been used as catalysts.

The oil and catalyst mixture is passed into the hydrogenation tower near the top and collected in pools on the bubble trays. Hydrogen is bubbled through the pools to thoroughly agitate and hydrogenate the oil. The catalyst and oil pass from one tray to another as the mixture progresses through the tower.

The hydrogenated oil is continuously removed from the tower and may be passed in heat exchange relationship with untreated oil before filtering catalyst therefrom. Catalyst removed by filtration or otherwise from the treated oil will be substantially exhausted. Usually after passing the hydrogenated oil in heat exchange relationship with the untreated oil, it is cooled sufficiently to permit filtration in any conventional manner. In some cases, however, additional cooling means or special filters in which the oil is not subjected to atmospheric conditions may be necessary.

The invention will be better understood by reference to the specific example which follows, although obviously the invention is not limited thereto.

*Example.*—Cottonseed oil was continuously hydrogenated to shortening consistency by charging the oil to be hydrogenated at a volumetric rate of 1,000 pounds per hour to a hydrogenation tower. The temperature was maintained in the tower at 350° F. The pressure in the tower was held at about 5 pounds per square inch. The hydrogen controller was set at 550 cubic feet per hour. The catalyst was then proportioned by the hydrogen meter and catalyst controller to effect a hydrogen absorption by the cottonseed oil at the rate set by the controller. The oil continuously removed from the tower was of shortening consistency with an iodine number of about 73.

In practicing the invention the fatty material to be hydrogenated is preheated and charged to the upper portion of the hydrogenation tower at a constant rate. Hydrogen under pressure is passed into each of the hydrogenation sections of the tower and allowed to bubble through the oil therein to agitate the same. The hydrogen is withdrawn from each of the sections and recycled. Sufficient hydrogen is charged to the tower to maintain a predetermined pressure. The hydrogen controller in the hydrogen charge line is set for a rate of flow which has been predetermined to give the desired iodine number for the hydrogenated oil. When the system is charged with hydrogen at a given pressure the flow of hydrogen into the system will cease until absorption of the hydrogen is begun. The catalyst slurry is then added to the oil stream which is charged to the tower and absorption of hydrogen by the oil is initiated.

An automatic control valve in the catalyst line regulates the flow of catalyst. The catalyst control valve is operated automatically by the hydrogen controller in the hydrogen charge line. For example, as the flow of hydrogen through the controller decreases or ceases the catalyst valve will be opened and catalyst will be charged to the tower. The catalyst causes absorption of hydrogen whereby the flow of hydrogen into the system through the hydrogen controller will either begin or, if begun, will increase. If the absorption of hydrogen becomes too rapid and the flow of catalyst too large, the flow of hydrogen through the control valve will increase and thereby cause the controller to regulate the catalyst control valve to the point where the catalyst addition is just enough to give the required hydrogen absorption.

The term "fatty material" as used herein is meant to include glyceride oils and fats, such as any animal, vegetable, or marine fat or oil, for example, lard oil, cottonseed oil, fish oil, soybean oil, tallow, etc., and fatty acids, such as red oil and vegetable and marine oil fatty acids.

Obviously, many modifications and variations of the invention as hereinbefore set forth may be made without departing from the spirit and scope thereof, and therefore only such limitations should be imposed as are indicated in the appended claims.

I claim:
1. A continuous method for the hydrogenation of unsaturated fatty materials which comprises passing the material at hydrogenation temperature through a hydrogenation zone, circulating hydrogen under pressure through said zone to agitate the oil and to cause hydrogenation, adding catalyst to the charged material to cause absorption of hydrogen by said material in the hydrogenation zone, and regulating the addition of the catalyst in response to variations in the flow of hydrogen to the system.

2. A continous method for the hydrogenation of unsaturated fatty materials which comprises charging preheated fatty material to a hydrogenation zone, charging a hydrogenation catalyst to said zone, circulating hydrogen through said zone to agitate the oil and to cause hydrogenation, introducing hydrogen into the system to maintain a predetermined pressure, automatically controlling the amount of catalyst charged to the system in response to variations in the rate of hydrogen added, and withdrawing hydrogenated material from the system.

3. A continuous method for the hydrogenation of unsaturated fatty materials which comprises maintaining a body of oil in a hydrogenation zone at hydrogenation temperature and pressure, passing hydrogen into said zone to agitate and hydrogenate the fatty material, charging fatty material and catalyst to said zone whereby the catalyst causes the absorption of hydrogen, maintaining a predetermined flow of hydrogen by automatically controlling the addition of catalyst in response to variations in the rate of flow of hydrogen added to the system whereby the absorption of hydrogen and the degree of hydrogenation is maintained at a substantially constant predetermined amount, and withdrawing the hydrogenated fatty material from the system.

4. A continuous method for the hydrogenation of unsaturated fatty oils which comprises charging the oil and a hydrogenation catalyst to a series of hydrogenation zones, maintaining the oil in said zones at hydrogenation temperatures and pressures, passing a stream of hydrogen in a predetermined amount into each of said zones, and automatically controlling the amount of catalyst charged to said zones in response to variations in the flow of hydrogen whereby a susbtantially constant absorption of hydrogen by the oil and a predetermined iodine value are obtained, and withdrawing hydrogenated oil and used catalyst from the system.

5. A continuous method for the hydrogenation of unsaturated fatty materials, which comprises delivering a body of oil into a hydrogenation zone at a constant hydrogenation temperature, maintaining a constant hydrogenation pressure by delivering hydrogen at a predetermined rate into said hydrogenation zone, said rate being sufficient to reduce the iodine number of the unsaturated fatty materials to a desired degree, and automatically controlling the amount of catalyst delivered into said hydrogenation zone in response to variations in the rate of hydrogen absorption in the system.

References Cited in the file of this patent
UNITED STATES PATENTS
2,520,425   Mills _____ Aug. 29, 1950
FOREIGN PATENTS
658,189   Great Britain _____ Oct. 3, 1951